US009147901B2

(12) United States Patent
Reiners et al.

(10) Patent No.: US 9,147,901 B2
(45) Date of Patent: Sep. 29, 2015

(54) FUEL CELL SYSTEM

(75) Inventors: Karsten Reiners, Esslingen (DE);
Christian Weiss, Rohrau (DE); Andreas Kaupert, Esslingen (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 88 days.

(21) Appl. No.: 13/549,815

(22) Filed: Jul. 16, 2012

(65) Prior Publication Data

US 2013/0171530 A1   Jul. 4, 2013

(30) Foreign Application Priority Data

Jul. 14, 2011   (DE) .......................... 10 2011 079 173

(51) Int. Cl.
 *H01M 8/06* (2006.01)
 *H01M 8/04* (2006.01)

(52) U.S. Cl.
 CPC ........ *H01M 8/0618* (2013.01); *H01M 8/04223* (2013.01); *H01M 8/0675* (2013.01); *H01M 8/04* (2013.01); *H01M 8/04022* (2013.01); *H01M 8/04097* (2013.01); *Y02E 60/50* (2013.01)

(58) Field of Classification Search
 None
 See application file for complete search history.

(56) References Cited

U.S. PATENT DOCUMENTS

| 4,388,175 A | * | 6/1983 | Lionetti et al. | .................. 208/74 |
| 4,960,506 A | | 10/1990 | Halbert et al. | |
| 2008/0070078 A1 | | 3/2008 | Gummalla et al. | |
| 2010/0266924 A1 | * | 10/2010 | Kaupert et al. | ............... 429/452 |

FOREIGN PATENT DOCUMENTS

DE    102009017597    *  4/2010  ........ H01M 8/04022

* cited by examiner

*Primary Examiner* — Miriam Stagg
*Assistant Examiner* — Carmen Lyles-Irving
(74) *Attorney, Agent, or Firm* — McGlew and Tuttle, P.C.

(57) ABSTRACT

A fuel cell system (1) with a fuel cell unit (2) including at least one fuel cell (3), as well as an anode gas feed (11) including a reformer (12). A reduced deposit of hydrocarbons on an anode (5) of the fuel cell (3), especially in case of a cold start of the fuel cell system (1), is achieved when the anode gas feed (11) has a reduction device (14), which is arranged between the reformer (12) and the anode (5).

20 Claims, 1 Drawing Sheet

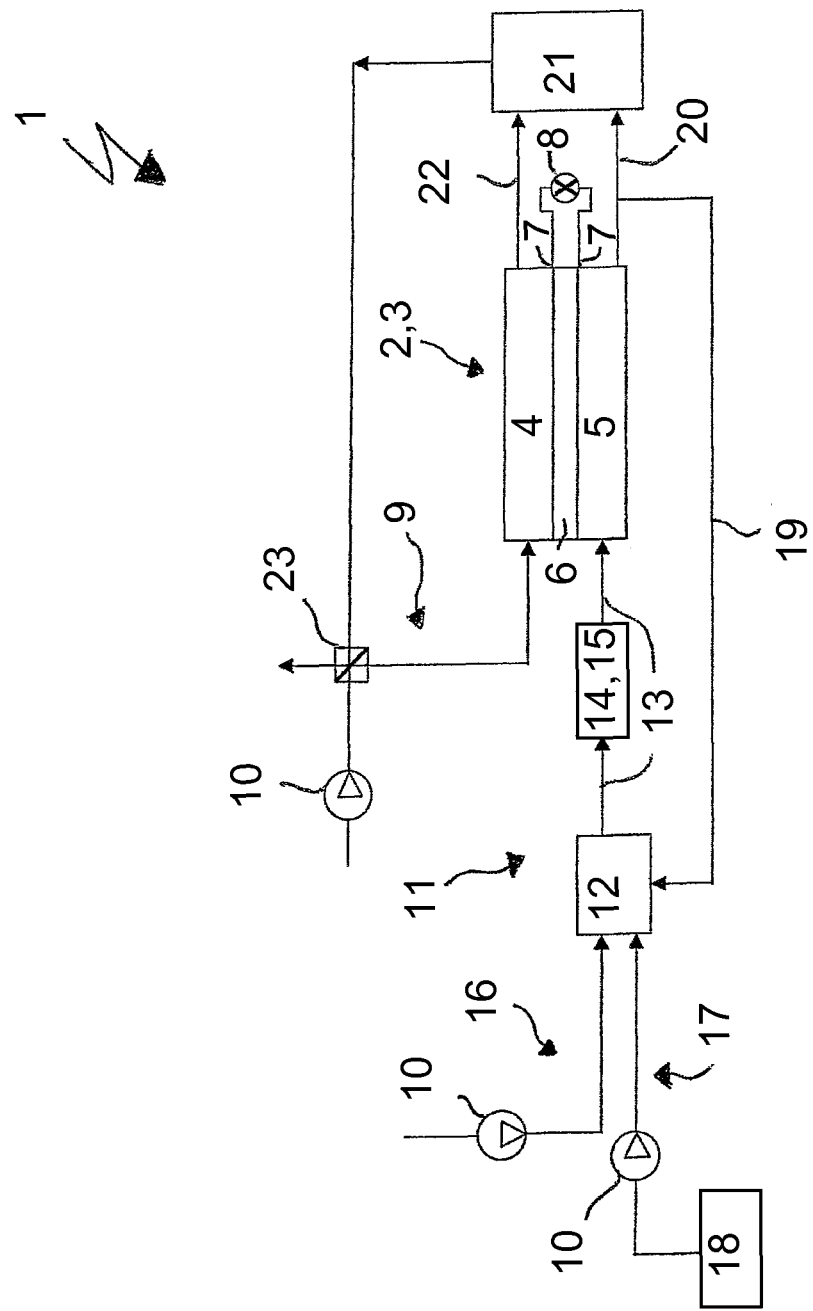

FUEL CELL SYSTEM

CROSS REFERENCE TO RELATED APPLICATIONS

This application claims the benefit of priority under 35 U.S.C. §119 of German Patent Application DE 10 2011 079 173.6 filed Jul. 14, 2011, the entire contents of which are incorporated herein by reference.

FIELD OF THE INVENTION

The present invention pertains to a fuel cell system, especially for a motor vehicle.

BACKGROUND OF THE INVENTION

A fuel cell system produces an electric voltage and makes this available to electric users. The fuel cell system has a fuel cell unit, which usually comprises a plurality of fuel cells, for this purpose. The individual fuel cells have an anode and a cathode, whereby the cathode dissociates and ionizes oxygen and the ionized oxygen migrates through an electrolyte of the fuel cell to the anode and reacts with hydrogen ionized by the anode into water. Thus, an electric potential or electric voltage, which is made available to the electric user, forms at the electrodes of the fuel cell according to the Nernst equation. The chemical reactions essential for the functionality of the fuel cells and especially the conductivity of the electrolyte for ionized oxygen start from a certain temperature, which is usually a few 100° C. On the other hand, the anodes are supplied with an anode gas usually via a reformer of an anode gas feed means, which supplies the anodes with a reformate gas as the anode gas. The reformate gas essentially comprises hydrocarbons, whereby the reformate gas usually has a temperature of a few 100° C. If the anode has a temperature which lies below a critical temperature, i.e., especially in case of a cold start, i.e., in a state, in which the anode has an ambient temperature or room temperature, then this leads to a deposit of hydrocarbons of the reformate gas on the anode surface. This is especially the case if the fuel cell, and especially if the anode, is brought to operating temperature with the reformate gas. The deposit of hydrocarbons on the anode surface leads, however, to a reduction in the chemical reactivity of the anode, which may lead to a failure of the anode and thus of the fuel cell system.

SUMMARY OF THE INVENTION

An object of the present invention is to provide an improved or at least alternative embodiment for a fuel cell system, which is characterized especially by a reduced deposit of hydrocarbons on an anode of the fuel cell system.

According to the invention, a fuel cell system is provided comprising a fuel cell unit comprising at least one fuel cell with a cathode, with an anode, and with at least two electric terminals for feeding an electric user. An anode gas feed means is provided for feeding a reformate gas to the anode. The anode gas feed means comprises a reformer for producing the reformate gas and a reduction means for reducing the concentration of higher hydrocarbons in the reformate gas. The reduction means is arranged between the reformer and the anode.

The present invention is based on the general idea of equipping a fuel cell system with a reduction means which converts higher hydrocarbons of a reformate gas produced by a reformer of an anode gas feed means of the fuel cell system into lower hydrocarbons. The anode gas feed means is used in this case to feed the reformate gas to an anode of a fuel cell or to anodes of a plurality of fuel cells of a fuel cell unit of the fuel cell system. The reduction means thus converts especially hydrocarbons with the chemical formula $C_nH_m$ into hydrocarbons with the chemical formula $C_xH_y$, whereby n is $>x$. The present invention makes use of the knowledge that a deposit of hydrocarbons on the anode at low temperatures of the anode, i.e., especially in case of a cold start of the fuel cell system or of the fuel cell unit, occurs to an increased extent in case of higher hydrocarbons. A conversion of higher hydrocarbons into lower hydrocarbons therefore leads to a prevention or at least to a reduction of the deposit of hydrocarbons on the anode, especially in case of a cold start of the fuel cell system or of the fuel cell unit. Accordingly, the reduction means may be designed such that the conversion of higher hydrocarbons into lower hydrocarbons can be controlled. This control may depend further and especially on the temperature of the anode or of the corresponding fuel cell.

According to the idea of the present invention, a fuel cell system according to the present invention has a fuel cell unit, which comprises at least one fuel cell. Furthermore, the fuel cell has anodes and a cathode, whereby at least two electric terminals of the fuel cell unit, which are connected to the respective electrodes, i.e., the anode and the cathode, are used for the electric supply of a user. The anode gas feed means also has the reformer as well as the reduction means, whereby the reduction means is advantageously arranged between the reformer and the anode. Thus, the reduction means converts higher hydrocarbons of the reformate gas produced by the reformer before a contact of the reformate gas with the anode into lower hydrocarbons. The deposit of hydrocarbons on the anode is therefore stopped or at least reduced, especially in case of a cold start of the fuel cell system. This reduction in the deposit of hydrocarbons now makes it possible, for example, to heat up the fuel cell and especially the anode by means of the reformate gas and to bring it to a corresponding operating temperature. The result of this is especially that possible components of the fuel cell system or external components, which are used exclusively for heating up the anodes, can be omitted.

The present invention also makes use of the knowledge that higher hydrocarbons are converted into lower hydrocarbons, especially in case of a hot gas desulfurization. Therefore, the present invention also makes use of the knowledge that during a desulfurization of a hot gas, i.e., of the reformate gas as well, higher hydrocarbons are converted into lower hydrocarbons.

Accordingly, the reduction means has a desulfurization means in a preferred embodiment. Optionally, an embodiment may be presented, in which the reduction means is designed as a desulfurization means. Therefore, the use of the desulfurization means is especially meaningful, since such desulfurization means are sufficiently well known, whereby equipping the fuel cell system with reduction means is especially simplified and economical.

For this purpose, the reduction means has at least one desulfurization step in another embodiment. If the reduction means has a plurality of desulfurization steps, then these can be arranged next to each other along a direction of flow of the reformate gas. This leads especially to an increased conversion of higher hydrocarbons into lower hydrocarbons.

In addition or optionally, the reduction means has a hydrodesulfurization means, or is designed as such, according to another embodiment. Higher hydrocarbons are therefore converted into lower hydrocarbons in this case especially by the use of hydrogen.

The reduction means has at least one catalytic converter according to another preferred embodiment. The catalytic converter especially serves the purpose of making possible or accelerating conversion of higher hydrocarbons into lower hydrocarbon[s]. For this, the catalytic converter has materials suitable for this purpose. Molybdenum-containing materials, especially nickel molybdenum and/or cobalt molybdenum may be indicated as examples thereof.

According to another preferred embodiment, a fuel needed for producing the reformate gas is fed by means of a fuel feed means. Therefore, the fuel feed means especially serves the purpose of feeding the fuel, which is preferably stored in a container, especially in a tank, to the reformer. For this, the fuel feed means has, for example, a conveying means, especially a pump.

For producing the reformate gas, the reformer usually needs an oxidant gas, which can be fed by an oxidant feed means to the reformer in another embodiment. Air is especially used in this case as oxidant gas, which, for example, is fed via a conveying means of the oxidant feed means to the reformer.

In another embodiment, the fuel cell system advantageously has a cathode gas feed means. The cathode gas feed means serves the purpose of feeding a cathode gas to the cathode of the fuel cell or to the cathodes of the fuel cells. The cathode gas feed means especially has a conveying means, for example, a pump for this. Oxygen-containing gases, for example, air are advantageously used as the cathode gas.

In another preferred embodiment, the fuel cell system has a recycling means. The recycling means makes it possible to make an anode waste gas of the fuel cell system feedable to the reformer. Therefore, the recycling means leads a part of the anode waste gas produced by the fuel cell unit to the reformer. As a result, possible and usable residual components of the reformate gas are reused and thus an efficiency of the fuel cell system is increased.

Another embodiment of the fuel cell system has a residual gas burner. The residual gas burner burns at least a part of the anode waste gas as well as a part of the cathode waste gas of the cathode. Also, a residual burner waste gas of the residual burner can be fed to a heat exchanger. In addition, the heat exchanger is preferably coupled to the cathode gas feed means in a heat-exchanging manner. Therefore, the heat exchanger heats up the cathode gas, i.e., for example, the air, before entry into the fuel cell or the fuel cell unit and thus before contact with the cathode.

It should be pointed out that the fuel cell unit may have a plurality of fuel cells, whereby the fuel cell unit comprises a plurality of anodes and a plurality of cathodes. The anode gas and cathode gas can be fed, for example, through the anode gas feed means or through the cathode gas feed means jointly for all cathodes or for all anodes. However, single or a plurality of cathodes or anodes may also be supplied separately with cathode gas or with anode gas. If the anodes of the fuel cell unit are not supplied with anode gas by a single anode gas feed means, then any number of these anode gas feed means may have such a reduction means, especially such a desulfurization means.

It is apparent that the above-mentioned features, which will also be explained below, are applicable not only to the particular combination described, but also in other combinations or alone as well without going beyond the scope of the present invention.

Other important features and advantages of the present invention appear from the drawing and from the corresponding description of the FIGURE on the basis of the drawing. A preferred exemplary embodiment of the present invention is shown in the drawing and will be explained in more detail in the following description. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 1 is a schematic, circuit-diagram-like and highly simplified embodiment of a fuel cell system.

DESCRIPTION OF THE PREFERRED EMBODIMENTS

Referring to the drawings in particular, according to FIG. 1, a fuel cell system 1 has a fuel cell unit 2, which comprises at least one fuel cell 3, whereby the embodiment shown has a single fuel cell 3. The fuel cell 3 has a cathode 4 and an anode 5, which are separated from each other by an electrolyte 6. An electric voltage produced by the fuel cell 3 is made available in this case to an electric user 8 via two electric terminals 7, which are connected to the cathode 4 or the anode 5. For producing the electric voltage, the fuel cell 3 is supplied with a cathode gas and an anode gas. For feeding the cathode 4 with cathode gas, the fuel cell system 1 has a cathode gas feed means 9. The cathode gas feed means 9 has a conveying means 10, which feeds a quantity of air to the cathode 4 as cathode gas. For feeding the anode 5 with anode gas, the fuel cell system 1 has an anode gas feed means 11, which comprises a reformer 12. The reformer 12 produces a reformate gas as anode gas, which is fed to the anode 5 via a feed line 13. For reducing higher hydrocarbons in the reformate gas, especially by converting them into lower hydrocarbons, the anode gas feed means 11 has within the feed line 13 a reduction means 14, which may be designed as a desulfurization means 15. The reduction means 14 or desulfurization means 15 is also arranged within the anode gas feed means 11 between the reformer 12 and the anode 5. The desulfurization means 15 is designed such that it can be disconnected (or bypassed). As a result, the desulfurization means 15 can be used especially during a cold start of the fuel cell system 1, during which there is a high probability of deposit of higher hydrocarbons on the anode 5. The reformer 12 needs a fuel and an oxidant gas for producing the reformate gas. For this, the fuel cell system 1 has an oxidant feed means 16 as well as a fuel feed means 17, whereby the oxidant feed means 16 feeds air, as oxidant gas, to the reformer 12 via a conveying means 10. The fuel feed means 17 likewise has a conveying means 10, which conveys the fuel from a tank 18 and feeds it to the reformer 12.

The fuel cell system 1 additionally comprises a recycling means 19, which makes an anode waste gas of the anode 5 feedable to the reformer 12. Therefore, a part of the anode waste gas can be fed to the reformer 12 by the recycling means 19. For this, the recycling means 19 is connected in a fluidic manner, on the one hand, to an anode waste gas line 20, and, on the other hand, to the reformer 12. The anode waste gas line 20 feeds the anode waste gas of the anode 5 to a residual gas burner 21 of the fuel cell system 1. The residual gas burner 21 is additionally connected to the fuel cell unit 21 by a cathode waste gas line 22, whereby the cathode waste gas line 22 feeds a cathode waste gas of the cathode 4 to the residual gas burner 21. The anode waste gas and the cathode waste gas are burned within the residual gas burner 21, whereby a residual gas burner waste gas forms, which is fed to a heat exchanger 23. The heat exchanger 23 is, on the other hand, coupled to the cathode gas feed means 9 in a heat-exchanging manner and thus heats up the cathode gas before entry into the fuel cell unit 2 or before contact with the cathode 4.

While specific embodiments of the invention have been shown and described in detail to illustrate the application of the principles of the invention, it will be understood that the invention may be embodied otherwise without departing from such principles.

What is claimed is:

1. A fuel cell system comprising:
a fuel cell unit comprising at least one fuel cell with a cathode, with an anode, and with at least two electric terminals for feeding an electric user; and
an anode gas feed means for feeding a reformate gas to the anode, the anode gas feed means comprising a reformer for producing the reformate gas and a reduction means for reducing the concentration of higher hydrocarbons in the reformate gas, the reduction means being arranged directly downstream of the reformer with respect to a flow of the reformate gas, wherein the reduction means is arranged directly between the reformer and the anode.

2. A fuel cell system in accordance with claim 1, wherein a desulfurization means is used as a reduction means, said reduction means receiving the reformate gas directly from the reformer and said reduction means only receiving the reformate gas from said reformer.

3. A fuel cell system in accordance with claim 2, wherein the reduction means has at least one desulfurization step, said reduction means being arranged directly upstream of the anode with respect to the flow of the reformate gas.

4. A fuel cell system in accordance with claim 2, wherein the reduction means has a hydrodesulfurization means.

5. A fuel cell system in accordance with claim 2, wherein the reduction means comprises at least one catalytic converter, said at least one catalytic converter having a molybdenum-containing material.

6. A fuel cell system in accordance with claim 2, further comprising a fuel feed means for feeding a fuel to the reformer.

7. A fuel cell system in accordance with claim 2, further comprising an oxidant feed means for feeding an oxidant gas directly to the reformer.

8. A fuel cell system in accordance with claim 2, further comprising a cathode gas feed means for feeding a cathode gas to the cathode.

9. A fuel cell system in accordance with claim 2, further comprising a recycling means for returning a part of an anode waste gas to the anode gas feed means.

10. A fuel cell system in accordance with claim 2, further comprising a heat exchanger and a residual gas burner for burning the anode waste gas and a cathode waste gas to form a burner waste gas, said burner waste gas being delivered directly to said heat exchanger.

11. A fuel cell system comprising:
a fuel cell unit comprising at least one fuel cell with a cathode, with an anode, and with at least two electric terminals for feeding an electric user; and
an anode gas feed connected to the anode and feeding a reformate gas to the anode, the anode gas feed comprising a reformer producing the reformate gas and a reduction device receiving the reformate gas directly from said reformer and reducing the concentration of higher hydrocarbons in the reformate gas to produce a reduced higher hydrocarbon reformate gas, the reduction device being arranged directly downstream of the reformer with respect to a flow of the reformate gas, said reduction device being arranged exclusively between the reformer and the anode and said reduction device supplying reduced higher hydrocarbon reformate gas to the anode, said reduction device receiving the reformate gas exclusively from the reformer.

12. A fuel cell system in accordance with claim 11, wherein said reduction device comprises a desulfurization device, said reduction device being arranged directly upstream of said anode with respect to the flow of the reformate gas.

13. A fuel cell system in accordance with claim 11, wherein the reduction device performs at least one desulfurization step, said anode being arranged directly downstream of said reduction device with respect to the flow of the reformate gas.

14. A fuel cell system in accordance with claim 11, wherein the reduction device comprises a hydrodesulfurization device.

15. A fuel cell system in accordance with claim 12, wherein the desulfurization device comprises a hydrodesulfurization device.

16. A fuel cell system in accordance with claim 11, wherein the reduction device comprises at least one catalytic converter, said at least one catalytic converter having a molybdenum-containing material.

17. A fuel cell system in accordance with claim 11, further comprising a fuel feed connected to the reformer and feeding a fuel to the reformer, wherein said anode receives said reduced higher hydrocarbon reformate gas directly from said reduction device.

18. A fuel cell system in accordance with claim 11, further comprising an oxidant feed connected to the reformer and feeding an oxidant gas directly to the reformer.

19. A fuel cell system in accordance with claim 11, further comprising a cathode gas feed connected to the cathode and feeding a cathode gas to the cathode.

20. A fuel cell system in accordance with claim 11, further comprising:
a heat exchanger;
a recycling connection returning a part of an anode waste gas to the anode gas feed; and
a residual gas burner burning the anode waste gas and a cathode waste gas to form a burner waste gas, said heat exchanger receiving said burner waste gas directly from said residual gas burner.

* * * * *